June 16, 1936.  H. C. LORD  2,044,392
JOINT
Filed Feb. 7, 1930
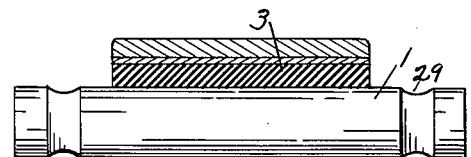
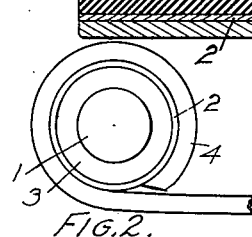
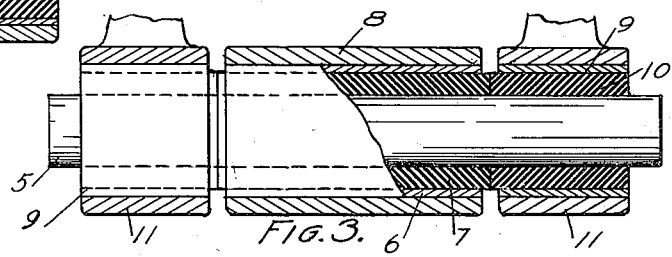
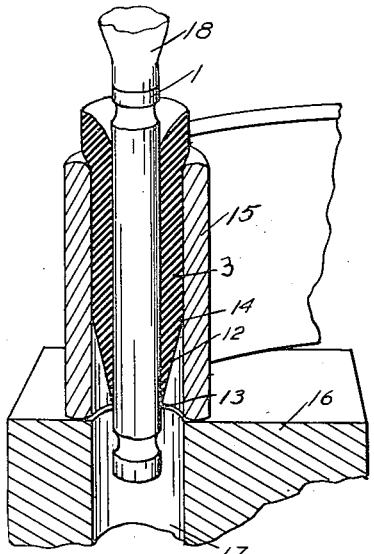
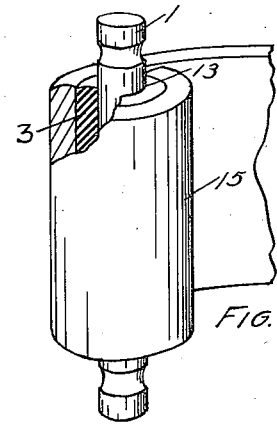
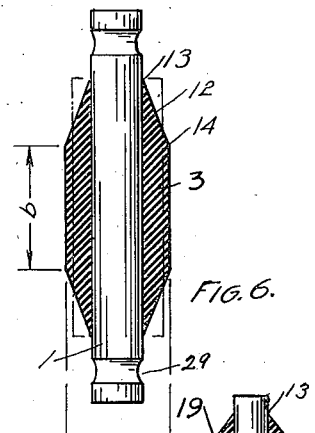
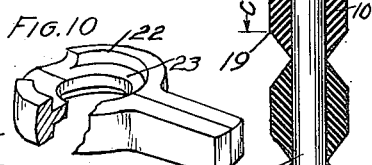
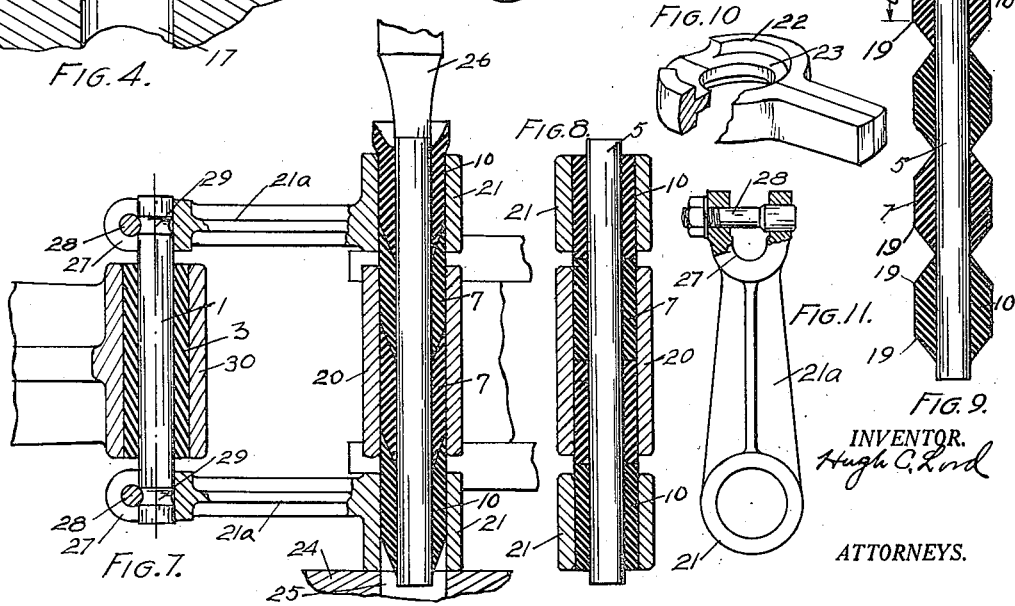
INVENTOR.
Hugh C. Lord
ATTORNEYS.

Patented June 16, 1936

2,044,392

UNITED STATES PATENT OFFICE 2,044,392

JOINT

Hugh C. Lord, Erie, Pa.

Application February 7, 1930, Serial No. 426,498

14 Claims. (Cl. 287—85)

The present invention is designed to form joints involving a rubber bushing which is designed to permit of the relative movement to which the parts connected by the rubber are subjected through the distortion of the rubber. Such joints have heretofore been made, as for example, the joint illustrated in my Patent #1,452,693. If the rubber is bonded both to the central pin and the outer sleeve forming complete annuli of the joint, particularly if bonded by vulcanization under heat, the joint is under tension due to the shrinkage of the rubber in cooling. Other joints have been made in which a rubber bushing of larger cross dimension than the final joint is used and is sufficiently stretched lengthwise by forcing it into the space between the pin and outer sleeve to put the rubber under very severe compression crosswise, the endwise tension being sufficient to maintain this compression and engagement of the rubber with the pin and sleeve surfaces. The latter structure presents some difficulty in fabrication as to the introduction of the rubber to the confining space and special tools and methods have been devised for accomplishing this purpose and difficulty is experienced in maintaining the rubber in position on the central member.

In the present invention there are utilized some of the advantages of both of said methods. In the present invention the resilient rubber member, as shown in the form of the rubber bushing, is permanently united to the inner member as shown in the form of the central pin and the union as by bonding is preferably extended over the major portion of the contacting area between the resilient member and inner member and, as shown, extends throughout the length of contact between said members. The resilient member is disposed between the outer member or sleeve and the inner member or pin and confined thereby under substantial compression. The compression is sufficient to place the body of the rubber under initial working pressure conditions and this pressure, as distinguished from tension, also assists in maintaining the union between the resilient member and the central member.

In the specific exemplification shown, the rubber sleeve or bushing is made larger than the outer sleeve and is forced into the sleeve by pressure exerted preferably on the pin so that the rubber as a whole is pulled by the pin into the space as distinguished from being pushed into the space between the outer and inner members as has heretofore been practiced with joints having the rubber under substantial compression. With this arrangement, it is preferable to initially form the rubber of a volume equal to the capacity of the space in which it is finally confined. A simple manner for providing for this equalizing is to initially taper the ends of the rubber forming the joint so as to compensate for the volume of rubber in the body of the joint outside of the final dimension.

Among the advantages of such a joint is that it may be supplied with an outer shell, forming a joint element which is of general application by introduction into the member to be serviced, in cartridge fashion, or by reason of the fact that the pin affords a simple means of introduction, the rubber bonded to the central pin may be forced into the final opening, or place of use, such as a spring eye, without the preliminary compression in a metal shell.

This advantage may be utilized where there are a plurality of joint units on a single pin, thus providing a greater turning capacity for the joint as the several spools, or bushings of rubber may be readily forced endwise into the several sleeves so as to provide the ultimate plural spool joint.

With the rubber held in its position lengthwise at the pin and distorted as it is forced into place into a smaller sleeve the rubber finally takes a position under high cross compression and has a shear distortion starting approximately at neutral at the center of the joint and increasing in such shear distortion toward the ends of the joint. This distortion and effort of the rubber to return to its original shape maintains the mass of rubber under high cross compression as the joint is subjected to use. On the other hand, the rubber being bound to the central pin which, by reason of its smaller surface, is subjected to a greater tendency to movement with relation to the rubber is assured of a continuous contact and consequent lack of wear through a wide range of shear movement either longitudinal or circumferential. While it is possible with this joint to subject the rubber to very high compression, nevertheless the joint is of greater capacity and durability even though of lighter yet substantial compression because under any condition there cannot be a separation of the rubber from the engaged surface of the pin. The engaged surface on the sleeve is much greater than that at the pin and consequently difficulty with relation to such surface is very much less. Features and details of the invention will appear more fully from the specification and claims.

The accompanying drawing illustrates a preferred embodiment of the joint as follows:—

Fig. 1 shows a central section of a single joint.

Fig. 2 an end view of the same.

Fig. 3 a central section of a joint made up of a number of elements, or units.

Fig. 4 a section showing the introduction of the rubber to a joint sleeve.

Fig. 5 a joint similar to that shown in Fig. 4 completed.

Fig. 6 a detached view of the central pin and rubber unit prior to its introduction to the joint.

Fig. 7 a sectional view showing the joints as applied to a rear spring shackle.

Fig. 8 a sectional view of a double joint, as shown in Fig. 7.

Fig. 9 a sectional view of the rubber as arranged on the pin for a double joint.

Fig. 10 a perspective view of a clamp used in holding the parts during the introduction of the rubber of the double joint, as illustrated in Fig. 7.

Fig. 11 a side elevation of one of the shackle hangers.

In the single joint, 1 marks the central pin. This is exemplified as a solid extended pin, but is not limited to this form. As illustrated in Fig. 1, 2 marks the outer sleeve, or shell, and 3 a bushing of rubber in the space between the shell and pin. As shown in Figs. 1 and 2, the shell is pressed into a spring eye 4. In Fig. 3 a joint having a plural number of joint elements is shown comprising a common central pin 5, a central outer shell 6, and a bushing 7 of rubber, 8 a joint member, such as a spring eye, 9 shells for the outer joint members, 10 rubber bushings between the shells 9 and the pin and 11 outer members, such as shackle hangers. In this structure the pin is floating. The outer spools, or bushings 10 are ordinarily half the length of the central member, their total equalling the central member. On rotating the central member relatively to the end members the pin takes an intermediate position. Thus the two joints are capable of a movement double that of a single unit joint with the same stress on the rubber.

In forming the joint, the rubber is permanently united with the pin. As shown it is bonded to the pin preferably by vulcanization so that there is a definite union between the pin and rubber. The rubber is initially formed of greater cross dimension, as indicated at $a$, Fig. 6, than the ultimate dimension which in Fig. 6 is indicated in dotted lines. The ends of the rubber are tapered at 12, the end of this taper at 13 corresponding with the ultimate length of the joint. The outer termini of the tapered surfaces 12 are so positioned relatively to the cross dimension $a$ as to assume a position in a plane at right angles to the axis of the joint and passing through the points 13 when the rubber is compressed within the space provided for it in the joint. Thus the distance $b$ between the termini 14 is greater, or less depending on the cross dimension $a$. If it is desired to place the rubber under greater distortion the dimension $a$ is increased and the dimension $b$ decreased so that the volume of rubber in its initial form equals the space in which the rubber is finally forced, as indicated in dotted lines in Fig. 6.

After the rubber has been thus formed on the pin it is lubricated, preferably with a rubber cement, but possibly by other lubricants, such as gasoline and entered in the end of a joint member, such as a spring eye 15. The spring eye is placed on a platen 16 having an opening 17 in register with the spring eye and pressure is exerted on the pin 1 by a plunger 18, the plunger being a part of any device designed to exert pressure. The pin is forced forward until the rubber is stretched rearwardly and in shear sufficiently to reduce its diameter to that of the interior of the sleeve. The rubber is forced through the spring eye to a point bringing the point 14 into register with the end of the spring eye, or sleeve. If properly proportioned, this will bring the point 14 at both ends into register at the same time. Upon the release of the pin it swings back to the central position. The rubber is, therefore, put under very severe cross compression and at the same time under shear distortion from a neutral zone at the center extending toward each end, the shear increasing from said neutral zone to the end. This distortion in shear which, of course, involves a substantial longitudinal stretching of the outer portion of the rubber as well maintains this cross compression throughout the life of the joint, the effort being, of course, to return to its original position and this effort increasing the cross pressure. In the preferred exemplification as shown in the drawing the extension of the rubber longitudinally in its outer periphery is greater than the thickness of the rubber wall in the completed joint, thus assuring in this relation high compression.

It will be understood that well-made rubber is almost incompressible so that any variation in cross size is accomplished through a distortion endwise. This endwise and shear distortion gives to the joint stability endwise and relieves the rubber at the center of a great portion of the stress which is necessary to maintain the cross pressure so that this rubber at the center which is opposed to the greater mass of rubber adjacent to the shell may be better disposed to maintain the stresses to which it is subjected in the movement of the joint, particularly the rotative movements of the joint.

The utilization of the pin as a means for introducing the rubber to the joint so simplifies this part of the process that it is feasible to force these joints directly into the place of use, such as the spring eye, because such introduction may be readily accomplished without the use of special tools. All that is necessary is some means for subjecting the pin to pressure which may be followed up with reasonable rapidity. In this way it is possible to reduce the size of the spring eye and thus increase its holding strength because by dispensing with the intermediate metallic material an equal wall of rubber may be formed with a smaller spring eye. Further the spring eye while having very high resistance to expansion will expand slightly and tend to maintain conformity of compression of the rubber wall through variations in the diameter of the spring eye through the ordinary tolerances of spring eyes.

In forming the plural joint, the rubber is placed upon a pin in sections, as shown in Fig. 9. The ends of each unit are beveled, this bevel being controlled so as to give to the rubber as a whole the proper volume and the proper distortion and the initial cross dimension of each unit is such as to give the rubber its proper cross compression. If the central bushing is made in a continuous piece, then the end members 10 ordinarily would be made of slightly larger diameter with the points 19 such as to make the lengths c comparatively short so that the shear distortion would correspond approximately to the shear distortion of the center. Another way of balancing the shear distortion is to divide the center spool, as shown in Fig. 9 into two sections. Thus there are four sections, two sections 10 and two sections 7. Under these conditions, all of these sections may be of exactly the same shape and will be equally stressed in the final position. The ends of the tapers 13 of each of the adjoining sections may come together, as clearly shown in Fig. 7, so that when the rubber is placed in the joint and the ends of the sections squared up these ends of the rubber will come practically into contact. Thus the central member of the joint, as illustrated in Fig. 9 in its final position as illustrated in Fig. 8, brings the two center ends of the sections 7 into close contact. In forcing this unit with the central pin and its plural joints into place, as for instance into place in a spring shackle the central member 20, which is a spring eye, and the sleeves 21 at the lower ends of the shackle hangers 21a are all clamped together by clamps 22, these clamps having shoulders 23 spacing the sleeves 21 and spring eye 20 as may be desired. This assembly is placed on a die 24 with an opening 25 in register with the sleeve opening, the joint put in place, and subjected to the action of a plunger 26 which drives all the sections as a whole into place in the several sleeves. As the pressure is relieved these several joints are centered and the joint at the adjoining ends of the sleeves 21 and spring eye protrude and are practically in contact. This bracing permits of placing the sleeves 21 and spring eyes slightly closer together without danger of moving into contact under side thrust. A single joint is placed in a goose neck 30. The hangers 21 are provided with slots 27 for receiving the ends of the joint in the goose neck and cross bolts 28 extend between the walls of the slots. These cross bolts engage grooves 29 in the pin 1 and thus clamp the shackle hangers 21a on said pin, thus rigidly tying the two shackle links 21a together through the pin 1. It is desirable to place the double joint in the spring eye where the hangers are of the compression type in that the turning movement of the spring eye due to the flexing of the spring is usually about double the turning movement in the goose neck.

The separation of the rubber into sections as are the sections 7 shown in Fig. 9 may be used in single joints where the length makes this desirable, or where it may be desired to more nearly balance the shear distortion throughout the length of the joint. As shown the sections form circumferential undulations, but in the broader phases of the invention the direction of undulations is not so limited.

The outer sleeves may be of any form and while I have shown this sleeve in the form of thin shells and in the form of a spring eye I do not with to be limited to any particular shape of sleeve, or to any particular relation between the outer and inner surfaces of the sleeve.

What I claim as new is:

1. A joint comprising an outer member, a substantially rigid inner member, a resilient rubber member disposed between the inner and outer members and permanently united with the inner member, the outer and inner members confining the resilient member under substantial compression sufficient to give the body of the resilient member an initial working pressure condition with substantial added resistance radially, and to assist in maintaining the union between the inner and resilient members.

2. A joint comprising an outer member, a substantially rigid inner member, said members having relative movement in shear relation, a resilient rubber member disposed between the inner and outer members and permanently united with the inner member and subjected to shear stress through relative shear movement of said outer and inner members, the outer and inner members confining the resilient member under substantial compression sufficient to give the body of the resilient member an initial working pressure condition with substantial added resistance radially, and to assist in maintaining the union between the inner and resilient members.

3. A joint comprising a substantially rigid inner member, an outer member, a resilient rubber member permanently united with the inner member throughout the major portion of the area of contact between said members, the outer and inner members confining the resilient member between them under substantial compression, sufficient to give the body of the resilient member an initial working pressure condition with substantial added resistance radially and to assist in maintaining the union between the inner and resilient members.

4. A joint comprising an outer member, a substantially rigid inner member, a resilient rubber member disposed between the inner and outer members and permanently united with the inner member, the outer and inner members confining the resilient member under substantial compression and longitudinal shear distortion sufficient to give the body of the resilient member an initial working pressure condition with substantial added resistance radially and to cause the rubber to flow longitudinally whereby an initial shear stress is produced and to assist in maintaining the union between the inner and resilient members.

5. In a joint, the combination of a substantially rigid central member; an outer sleeve; and a resilient rubber member between the sleeve and central member, said resilient member being permanently united to the central member before insertion into the sleeve, the diameter of the sleeve being sufficiently smaller than that of the resilient member originally that a portion of the resilient member is substantially extended longitudinally and said member is subjected to high radial compression and longitudinal tension.

6. In a joint, the combination with a substantially rigid member, an outer member, a resilient rubber member, said inner and outer members confining between them said resilient member under compression, said resilient member being permanently united to the inner member, the outer member and resilient member being so proportioned that when the resilient member is confined between the inner and outer members it is extended from the neutral condition to a greater extent longitudinally on its outer portion than the radial thickness between the inner and outer members in the completed joint.

7. A joint comprising a substantially rigid inner member, a resilient rubber member permanently united with the inner member, and having one end tapered, and an outer member, the outer and inner members confining between them said resilient member under substantial compression, said compression extending the outer portion of the resilient member longitudinally at the tapered end.

8. In a joint, the combination of a rigid metallic central member; an outer sleeve; and a resilient rubber bushing between the sleeve and central member, said bushing being initially tapered at one end and bonded to the central member before insertion into the sleeve and so proportioned with respect to the sleeve as to accommodate rubber displaced by longitudinal extension and radial reduction thereof while holding the rubber at the bond against longitudinal displacement.

9. In a joint, the combination of a rigid metallic central member; an outer sleeve; and a resilient rubber bushing between the sleeve and central member, said bushing being initially tapered at both ends and bonded to the central member before insertion into the sleeve and so proportioned with respect to the sleeve as to accommodate rubber displaced by longitudinal extension and radial reduction thereof while holding the rubber at the bond against longitudinal displacement.

10. In a joint, the combination of a rigid metallic central member; an outer sleeve; and a resilient rubber member between the sleeve and central member, said resilient member being initially tapered at both ends and permanently united to the central member before insertion into the sleeve, the bonded area extending approximately the full length of the sleeve and the rubber member so proportioned with respect to the sleeve as to accommodate the rubber displaced by longitudinal extension and radial reduction thereof while holding the rubber at the bond against longitudinal displacement.

11. In a joint, the combination of a substantially rigid central member; an outer sleeve; and a resilient rubber member between the sleeve and central member, said member being permanently united to the central member before insertion into the sleeve, said member originally having an undulating outer surface, the diameter of the sleeve being sufficiently smaller than that of the crests of the member originally to place the resilient member under substantial compression and extend the crests to fill the major portion of the voids originally formed by the troughs.

12. A joint comprising a substantially rigid inner member, a plurality of outer members around said inner member, a resilient member disposed between each outer member and the inner member and united to the inner member, said outer and inner members confining the resilient members between them under substantial compression, the compression being sufficient to give to the body of the resilient members an initial working pressure condition with substantial added resistance radially and to assist in maintaining the union between the inner and resilient members.

13. In a joint, the combination of a substantially rigid central member; a resilient outer sleeve; and a resilient rubber member between the sleeve and central member, said resilient member being permanently united to the central member before insertion into the sleeve, the diameter of the sleeve being smaller than that of the resilient member originally and the resistance of the sleeve tending to maintain a predetermined degree of compression of the resilient member.

14. A joint element in the form of a unit comprising an outer resilient rubber member tapered at its ends permanently united with a substantially rigid center member, said rubber member being adapted for insertion into a metal sleeve under high compression and longitudinal shear.

HUGH C. LORD.